United States Patent
McCormick et al.

(10) Patent No.: US 10,958,545 B2
(45) Date of Patent: Mar. 23, 2021

(54) MONITORING TRAFFIC FLOWS OF CONTAINERS IN A SEGMENTED NETWORK ENVIRONMENT

(71) Applicant: Illumio, Inc., Sunnyvale, CA (US)

(72) Inventors: Thomas Michael McCormick, San Jose, CA (US); Juraj George Fandli, Campbell, CA (US)

(73) Assignee: Illumio, Inc., Sunnyvale, CA (US)

( * ) Notice: Subject to any disclaimer, the term of this patent is extended or adjusted under 35 U.S.C. 154(b) by 61 days.

(21) Appl. No.: 16/113,724

(22) Filed: Aug. 27, 2018

(65) Prior Publication Data

US 2020/0067801 A1    Feb. 27, 2020

(51) Int. Cl.
*H04L 12/26* (2006.01)
*H04L 29/06* (2006.01)

(52) U.S. Cl.
CPC ........ *H04L 43/062* (2013.01); *H04L 43/0876* (2013.01); *H04L 63/029* (2013.01)

(58) Field of Classification Search
None
See application file for complete search history.

(56) References Cited

U.S. PATENT DOCUMENTS

| | | | |
|---|---|---|---|
| 7,725,601 B2 | 5/2010 | Conzola et al. | |
| 9,560,081 B1 | 1/2017 | Woolward | |
| 2007/0061441 A1 | 3/2007 | Landis et al. | |
| 2013/0055248 A1 | 2/2013 | Sokolinski et al. | |
| 2014/0373091 A1 | 12/2014 | Kirner et al. | |
| 2016/0191508 A1 | 6/2016 | Bestler et al. | |
| 2019/0280979 A1* | 9/2019 | Jain | G06F 9/45558 |
| 2019/0281014 A1* | 9/2019 | Lin | H04L 61/2517 |

FOREIGN PATENT DOCUMENTS

CA    2944361 A1    10/2015

OTHER PUBLICATIONS

PCT International Search Report and Written Opinion, PCT Application No. PCT/US2019/048202, dated Nov. 15, 2019, 20 pages.

* cited by examiner

*Primary Examiner* — Saba Tsegaye
(74) *Attorney, Agent, or Firm* — Fenwick & West LLP

(57) ABSTRACT

A traffic control and monitoring module includes a firewall operating in a container namespace that is configured to control and monitor traffic to and from a container in the container namespace. The traffic control and monitoring module reports detected traffic to a traffic flow reporting module operating in a host namespace of the host operating system. The traffic control and monitoring module obtains traffic flows associated with a plurality of containers in different container namespaces and reports the traffic flows to a segmentation policy. Based on the reported traffic flows, the segmentation server may update a segmentation policy to improve network security.

20 Claims, 4 Drawing Sheets

MONITORING TRAFFIC FLOWS OF CONTAINERS IN A SEGMENTED NETWORK ENVIRONMENT

BACKGROUND

Technical Field

This application relates to monitoring traffic flows in a segmented network environment.

Description of Related Art

A segmentation policy comprises a set of rules that control which workloads may communicate on a network and may place restrictions on how such workloads may communicate. In a segmented network environment, it is desirable to monitor traffic flows between workloads in order to track performance of the segmentation policy and update the segmentation policy based on the traffic flows to provide improved security. However, accurately monitoring traffic flows may be challenging when the workloads execute in a containerized environment. For example, the traditional technique of identifying workloads based on IP address may fail because the IP addresses of containers may change frequently or containers may be behind a network address translation (NAT) mechanism. Additionally, a container may commonly be terminated when not in use and another container may be later be instantiated having essentially the same profile and performing effectively the same function as the original workload, but with a different IP address. Furthermore, different container systems may manage the IP addresses of containers differently. Therefore, traditional segmentation systems may fail to provide the desired level of visibility and control of the containerized workloads. As a result, traditional segmentation systems may fail to adapt the segmentation policy to the network conditions and may therefore fail to provide the desired level of security.

SUMMARY

A system, non-transitory computer-readable storage medium, and method monitors traffic flows associated with a container. A configuration generation module executing in a host namespace of a host operating system obtains a workload identifier for the container executing in a container namespace of the host operating system. The configuration generation module configures a firewall executing within the container namespace to report traffic information pertaining to traffic to and from the container to a traffic flow reporting module executing in the host namespace, and to attach the workload identifier for the container as metadata to the traffic information. The traffic flow reporting module obtains from the firewall executing in the container namespace, the traffic information pertaining to the container including the workload identifier. The traffic flow reporting module reports the workload identifier and the traffic information pertaining to the container to a segmentation server to enable the segmentation server to update a segmentation based on the traffic information.

In an embodiment, a label set comprising one or more labels associated with the container is obtained from a container orchestration layer of the host operating system. The label set is transmitted to the segmentation server. The segmentation server generates the workload identifier for the container based on the label set.

In an embodiment, configuring the firewall comprises executing a command to select the container namespace and executing a utility program in the host namespace to configure tables of the firewall associated with the container namespace.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

A traffic control and monitoring module includes a firewall operating in a container namespace that is configured to control and monitor traffic to and from a container in the container namespace. The traffic control and monitoring module reports detected traffic to a traffic flow reporting module operating in a host namespace of the host operating system. The traffic control and monitoring module obtains traffic flows associated with a plurality of containers in different container namespaces and reports the traffic flows to a segmentation policy. Based on the reported traffic flows, the segmentation server may update a segmentation policy to improve network security.

Figure 1:
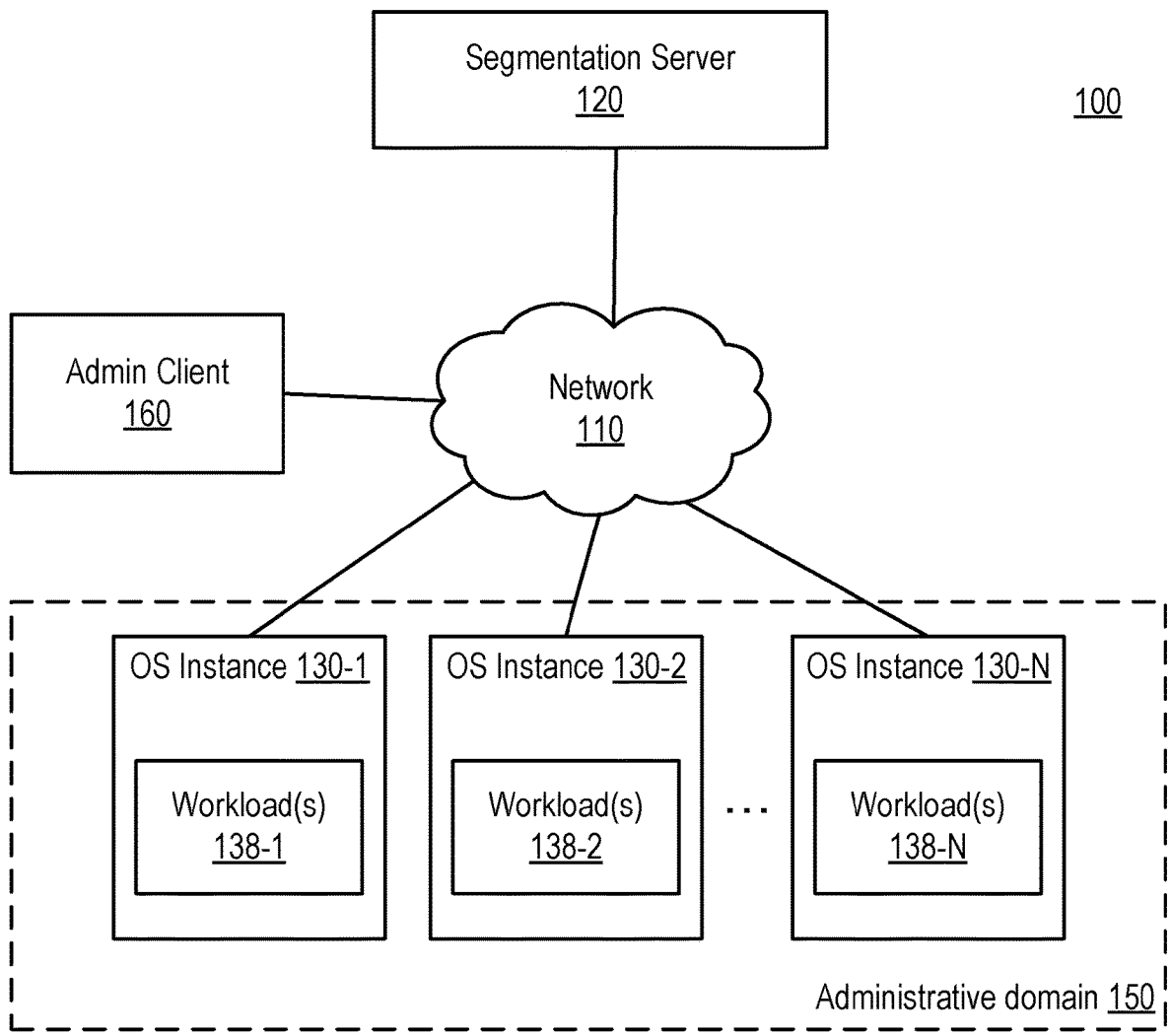
FIG. 1 is a high-level block diagram illustrating an environment for managing a segmentation policy, according to one embodiment.

FIG. 1 is a high-level block diagram illustrating a networked computing environment 100. The networked computing environment 100 includes a segmentation server 120, a network 110, an administrative client 160, and an administrative domain 150 that includes a plurality of operating system (OS) instances 130 (e.g., OS instances 130-1, 130-2, . . . , 130-N). The administrative domain 150 can correspond to an enterprise such as, for example, a service provider, a corporation, a university, or a government agency under control of the segmentation server 120.

The network 110 represents the communication pathways between the segmentation server 120, the administrative client 160, and the OS instances 130. In one embodiment, the network 110 uses standard communications technologies and/or protocols and can include the Internet. In another embodiment, the entities on the network 110 can use custom and/or dedicated data communications technologies.

The OS instances 130 comprise instances of an operating system executing on one or more computing devices. An OS instance 130 may execute directly on a physical machine or on a virtual machine that executes on one or more computing devices. A single physical or virtual machine may operate a single OS instance 130 or may operate multiple OS instances 130 The OS instances 130 each execute one or more workloads 138 (e.g., one or more workloads 138-1, one or more workloads 138-2, etc.). The workloads 138 comprise independently addressable computing units for performing computing tasks. A workload 138 may comprise, for example, an application or application component, a process, a container, or other sub-component thereof executing on the OS instance 130. In some instances, an OS instance 130 may operate only a single workload 138. In other instances, an OS instance 130 may operate multiple workloads 138 (e.g., multiple containers) that may be independently addressable and may perform different independent computing functions. The workloads 138 on the OS instances 130 may communicate with other workloads 138 on different OS instances 130 within the administrative domain 150 to perform various tasks.

The segmentation server 120 is a computer (or set of computers) that obtains and stores information about the OS instances 130 on the network 120 and the workloads 138 executing on the OS instances 130. The segmentation server 120 manages a segmentation policy for the administrative domain 150 that regulates communications between workloads 138 within the administrative domain 150. In an embodiment, the segmentation policy is set forth using permissive rules that specify the communications that are permitted. The segmentation policy is enforced by blocking any communications that are not expressly permitted by the rules. For example, the segmentation policy includes a set of rules specifying whether certain workloads 138 are allowed to provide services to or receive services from other workloads 138, and may place restrictions on how those workloads 138 are allowed to communicate when providing or consuming the services. For example, a segmentation policy may include a rule specifying that a workload 138-1 operating on an OS instance 130-1 is allowed to provide a particular service to a workload 138-2 operating on an OS instance 130-2. Absent other rules, the workload 138-1 will thus be blocked from providing the service to a workload 138-N operating on an OS instance 130-N. The rule may furthermore specify the type of service that the workload 138-1 is allowed to provide to workload 138-2 (e.g., a database service, a web service, etc.). Additionally, the rule may specify how the workloads 138-1, 138-2 may communicate when providing this service (e.g., using encrypted communication only, using authenticated communication only, etc.). A rule may be specified as a plurality of fields including a "service," a "provided-by" portion that identifies one or more workloads 138 that is permitted to provide the service (which may be specified by a port number), a "used-by" portion that identifies one or more workloads 138 that is permitted to use the service provided by the workloads 138 in the "provided-by portion," and a "rule function" that may place one or more restrictions on the communications between the workloads 138 while facilitating the service.

In an embodiment, the segmentation server 120 may assign one or more labels to each workload 138 that define one or more high-level characteristics of the workload 138. Labels may be multi-dimensional. Here, a label may comprise a "dimension" (a high-level characteristic) and a "value" (the value of that high-level characteristic). For example, one possible label dimension may specify a "role" of the workload 138 and may have values such as "web," "API," or "database" specifying the role of the workload 138 within the administrative domain 150. In another example, a label dimension may specify a "location" of the workload 138 and may have values such as "United States" or "Europe." Workloads 138 may also be labeled based on a user group of a user that is logged into the workload 138 or the corresponding OS instance 130 on which the workload 138 executes. For example, a workload 138 may have a label with a dimension "user group" and a value "managers." Each workload 138 may be assigned labels for one or more dimensions but each workload 138 does not necessarily have a label assigned for every possible dimension. For example, a workload 138 may have a label specifying its location but may not necessarily have a label specifying its role. The set of labels assigned to a particular workload 138 may be referred to herein as a label set for the workload 138.

A logical management model specifying the number and types of dimensions available and those dimensions' possible values may be configurable. In one embodiment, the logical management model includes the following dimensions and possible values, as shown in Table 1:

TABLE 1

Example of logical management model

| Dimension | Meaning (M), Values (V) |
|---|---|
| Role | M: The role of the workload within the administrative domain.<br>V: web, API, database |
| Environment | M: The lifecycle stage of the workload.<br>V: production, staging, development |
| Application | M: The logical application (higher-level grouping of managed servers) to which the workload belongs.<br>V: trading, human resources |
| Line of Business | M: The business unit to which the workload belongs.<br>V: marketing, engineering |
| Location | M: The location of the workload. Can be physical (e.g., country or geographical region) or logical (e.g., network). Physical is particularly useful for expressing geographic compliance requirements.<br>V: US or EU (physical), us-west-1 or us-east-2 (logical) |
| User Group | M: The user group containing the user logged onto the workload.<br>V: Engineers, Contractors, Managers, System Administrators |

The segmentation server 120 may utilize label sets to enable the segmentation policy to be defined at a high level of abstraction by specifying rules based on label sets. Thus, a rule of the segmentation policy may identify a group of workloads 138 to which a portion of the rule is applicable by referencing one or more label sets. For example, a rule may specify that a first group of workloads 138 with a label set A may provide a service B to a second group of workloads 138 with a label set C. Rules may be specified for groups of workloads 138 identified using only a subset of the label dimensions.

The segmentation server 120 may retain a repository storing information about the OS instances 130 and the workloads 138 managed by the segmentation server 120. For example, the segmentation server 120 may store workload identifiers that identify the workloads 138, and membership information indicating one or more groups of workloads 138 to which each workload 138 belong (e.g., as defined by the respective label sets for the workloads 138). The workload identifiers may be assigned such that they are unique to each workload 138 and are unchanging even in containerized environments or when workloads 138 are behind network address translation (NAT) devices.

Table 2 illustrates an example of information stored by the segmentation server 120. Here, the workload IDs represent the workload identifiers for the workloads 138. The memberships represent groups to which one or more workloads 138 belongs. Each group may correspond to a unique label set involving one or more dimensions.

TABLE 2

Example of a Repository Table

| Workload ID | Memberships |
| --- | --- |
| ID1 | A, C, D |
| ID2 | B, C |
|  | D |
| . | . |
| . | . |
| . | . |
| IDn | B, D, E, F |

Instead of enforcing the segmentation policy at a centralized device, the segmentation policy is instead enforced by at least a subset of the OS instances 130. To enable enforcement of the segmentation policy, the segmentation server 120 generates a set of management instructions and distributes the management instructions to the OS instances 130. The management instructions include the rules controlling communications between different groups of workloads 138 (e.g., specified by their label sets or directly by an identifier of the workload 138) and membership information indicating workloads 138 belonging to each group (e.g., which workloads 138 have certain label sets). For efficiency of distribution, the segmentation server 120 may send different management instructions to different OS instances 130 so that each OS instance 130 gets only the management instructions relevant to its operation. Here, the segmentation server 120 may determine which rules are relevant to a given OS instance 130 and distribute the relevant rules to that OS instance 130. A rule may be deemed relevant to a particular OS instance 130 if that OS instance 130 executes one or more workloads 138 that belongs to a group (defined by one or more label sets) referenced by the rule. The segmentation server 120 may furthermore determine which membership information is relevant to each OS instance 130 and distribute the relevant membership information to each respective OS instance 130. Here, membership information may be relevant to a particular OS instance 130 if it defines membership of a group referenced by a rule deemed relevant to the particular OS instance 130. Further details of a segmentation system for controlling communications between OS instances 130 based on labels is described in U.S. Patent Application Publication No. 2014/0373091 entitled "Distributed Network Security Using a Logical Multi-Dimensional Label-Based Policy Model," to Paul J. Kirner, et al., which is incorporated by reference herein.

In an embodiment, the segmentation server 120 automatically generates or updates a segmentation policy based on monitored traffic flows between the workloads 138. For example, the segmentation server 120 may observe which workloads 138 communicate with each other under a very permissive segmentation strategy and the manner in which they communicate under normal conditions. The segmentation server 120 may then automatically generate a more restrictive segmentation policy that limits communications to those consistent with the observed communications. In this manner, anomalous communications that may be indicative of malicious behavior may be blocked. In other embodiments, the segmentation server 120 may generate the segmentation policy based on monitored traffic flows according to different segmentation strategies. The segmentation server 120 may furthermore generate a traffic flow graph comprising a graphical representation of the traffic flows between workloads 138. The traffic flow graph may be useful to enable a network administrator to better understand how the workloads 138 interoperate and may enable the administrator to create an improved segmentation policy or an improved strategy for automatically generated the segmentation policy.

The administrative client 160 comprises a computing device that may be operated by an administrator of the administrative domain 150 being managed by the segmentation server 120. The administrative client 160 may execute an interface (e.g., via an application or web browser) that enables the administrator to interact with the segmentation server 120 to configure or view the segmentation policy. The interface may furthermore enable the administrator to obtain various information about the OS instances 130 and workloads 138 on the network 120 and view traffic flows between the workloads 138.

Figure 2:
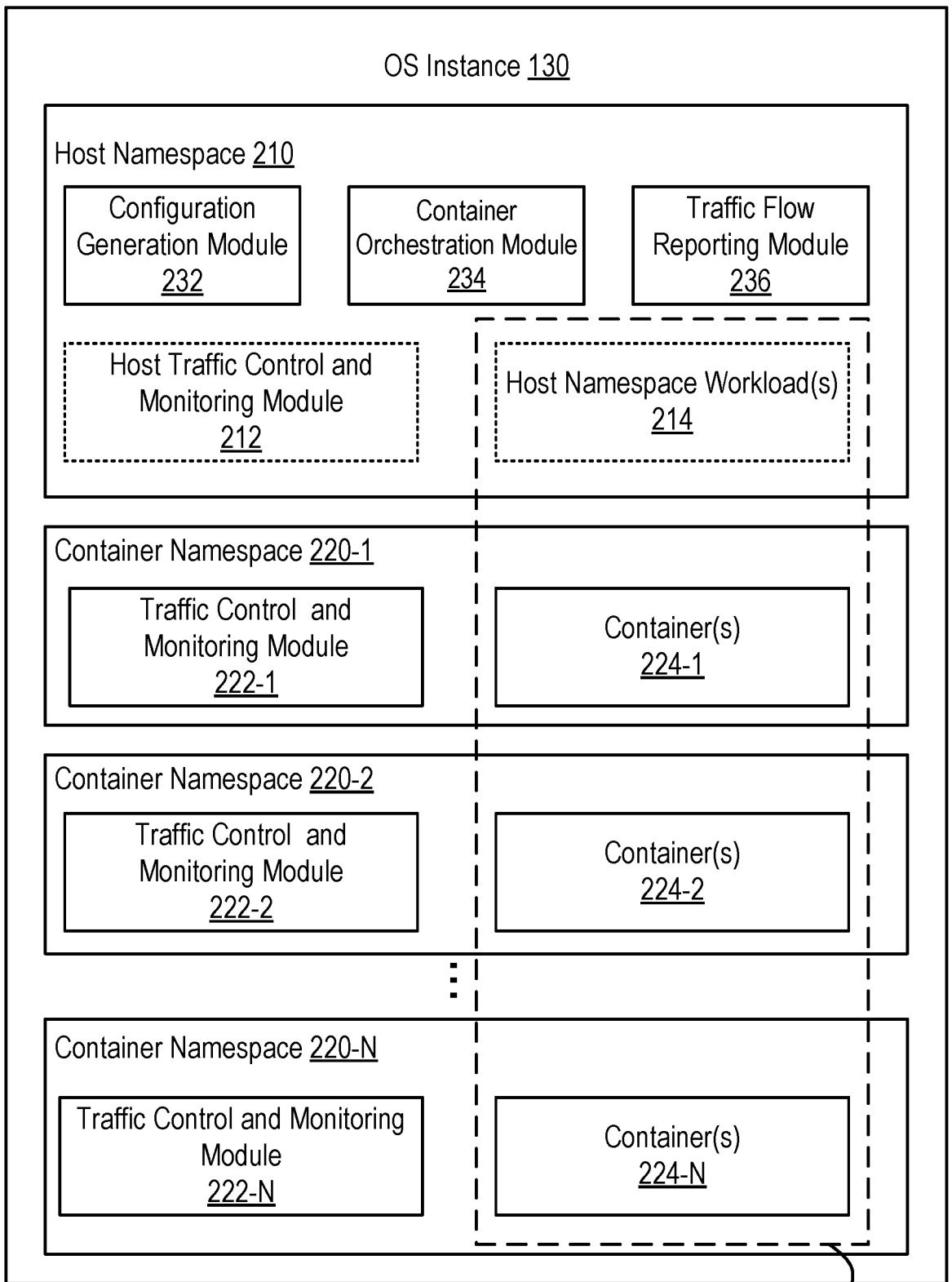
FIG. 2 is a block diagram illustrating an example embodiment of an operating system instance including container namespaces.

FIG. 2 illustrates an example embodiment of an OS instances 130. The OS instance 130 is organized into multiple namespaces including a host namespace 210 and one or more container namespaces 220. A namespace comprises an abstraction of global system resources that causes a global system resource to appear to processes within a namespace as if the processes in the namespace have access to an isolated instance of the global system resource. Changes to a global system resource by a process in a namespace are visible to other processes within the namespace but are invisible to processes outside the namespace. The operating system instance 130 separately manages processes or objects in different namespaces to avoid naming collisions. Thus, processes with the same namespace may operate concurrently in different namespaces. In an embodiment, the host namespace 210 comprises a primary network namespace for processes associated with system level functions of the OS instance 130. Thus, non-containerized processes of the OS instance 130 generally operate in the host namespace 210. One or more workloads 138 can also optionally operate in the host namespace 210 as one or more host namespace workloads 214.

A container namespace 220 is a network namespace associated with one or more containers 224. One or more containers 224 may execute in each of the respective container namespaces 220. Here, a container 224 is a set of processes executing within a user space of a container namespace 220 that is shared with the kernel of the OS instance 130 (i.e., the container 224 does not have a separate kernel). A container 224 may be defined by a combination of its kernel features, control groups, and its namespace. The container namespaces 220 referenced herein may refer to network namespaces on LINUX operating systems or compartments on WINDOWS operating systems. Containers 224 are useful to provide isolation between different virtual hosting environments executing on the same OS instance 130. For example, the processes associated with a first container 224-1 in the first container namespace 220-1 have visibility only into the resources within the first container namespace 220-1 and are isolated from resources outside the first container namespace 220-1. Thus, a first container 224-1 does not have visibility into resources associated with the container namespaces 220-2, . . . , 220-N. In an administrative domain 150, containers 224 may be utilized to provide isolation between different types of applications. For example, a first container 224-1 may execute processes associated with database applications and a second container 224-2 may execute processes associated with web applications. An example of a container 224 may comprise, for example, DOCKER or CONTAINERD. The one more containers 224 represent specific types of the workloads 138 managed by the segmentation policy as described above. Thus, a container 224 may respectively be assigned labels and may be controlled by rules of the segmentation policy as described above.

The traffic control and monitoring modules 222 each comprise a low-level network firewall or security engine that controls and monitors incoming and outgoing traffic associated with a respective container 224 executing in the container namespace 220 of the OS instance 130. A traffic control and monitoring module 222 operates to filter incoming and outgoing packets to the container 224 based on a table specifying packets that should be blocked or permitted based on a source and/or destination identifier associated with a packet (e.g., IP addresses). Thus, the traffic control and monitoring module 222 in a particular container namespace 220 operates to restrict communications to or from a container 224 in the particular container namespace 220. For example, a traffic control and monitoring module 222 may permit a particular container 224 in the associated container namespace 220 to communicate with a limited set of workloads 138 on other OS instances 130, and may block other communications. Furthermore, the traffic control and monitoring module 222 may place restrictions on how a container 224 in the associated container namespace 220 is permitted to communicate. Thus, for a container 224, the associated traffic control and monitoring module 222 may enable the container 224 to communicate using only encrypted protocols and block any unencrypted communications.

The traffic control and monitoring modules 222 may furthermore be configured to each provide traffic flow information to the traffic flow reporting module 236 describing traffic flow to and from the respective associated containers 224. For example, a firewall of the traffic control and monitoring module 222 may be configured with a firewall rule that causes the firewall to report all traffic flow through the firewall. In an embodiment, the traffic flow information reported from the traffic control and monitoring modules 222 for a particular communication may include, for example, a source identifier identifying a source address (e.g., source IP address) of the communication, a destination identifier identifying a destination address (e.g., destination IP address) of the communication, ports associated with the communication used by the source and destination workloads 138, and a protocol associated with the communication. The information may be derived, for example, from header data included in packets of the communications. The traffic control and monitoring module 222 may furthermore store a workload identifier for the container 224 associated with the traffic control and monitoring module 222 reporting the traffic flow information and attach the workload identifier for the container 224 to the traffic flow information when reporting to the traffic flow reporting module 236. Here, the workload identifier for the container is assigned by the segmentation server 120 and remains constant during a lifespan of the container 224. Thus, unlike other identifiers such as an IP address, the workload identifier is not affected by mechanisms such as network address translation and does not change.

In an embodiment, the traffic control and monitoring modules 222 may each comprise an operating system-level firewall such as a Linux kernel firewall based on Netfilter modules or a Windows firewall based on a Windows Filtering Platform. Furthermore, the traffic control and monitoring modules 222 may comprise an Internet Protocol security (IPsec) engine that controls encryption and decryption of packets sent to and from the respective container 224. In an embodiment, the traffic control and monitoring modules 222 each operate in the kernel space of the OS instance 130.

The OS instance 130 may optionally also include one or more host namespace workloads 214 executing in the host namespace 210 and a host traffic control and monitoring module 212 that controls and monitors communications to and from the host namespace workload 214. The host traffic control and monitoring module 212 may comprise a firewall or security engine that controls communications to and from the host namespace workload 214, and may be configured to report traffic flow information associated with the host namespace workload 214 (with the workload identifier for the host namespace workload 214 attached as metadata) in the same manner as the traffic control and monitoring modules 222 described above.

Various system modules execute in the host namespace 210 including a configuration generation module 232, a container orchestration module 234, and a traffic flow reporting module 236. The configuration generation module 232 receives the management instructions from the segmentation server 120 and translates the management instructions from a high level set of instructions to a low level configuration of the traffic control and monitoring modules 222. For example, the configuration generation module 232 obtains the relevant rules and relevant membership information in the received management instructions and identifies the specific containers 224 referenced by the label sets specified in the rules. The configuration generation module 232 then configures the traffic control and monitoring modules 222 to control traffic to and from the containers 224 to enforce the management instructions. In an embodiment, the configuration generation module 232 includes an iptables executable that executes to program respective filtering tables of the traffic control and monitoring modules 222.

The configuration generation module 232 may furthermore configure the traffic control and monitoring modules 222 to report traffic flow information relating to traffic flows to and from the containers 224 to the traffic flow reporting module 236. Here, the configuration generation module 232 may obtain the workload identifiers associated with the respective containers 224 and configure the respective traffic control and monitoring modules 222 with rules that cause each traffic control and monitoring module 222 to attach the associated workload identifiers as metadata when reporting the respective traffic flows as described above.

In an embodiment, the configuration generation module 232 switches between namespaces in order to configure the different traffic control and monitoring modules 222 using an operating system command for changing namespaces. For example, to configure a traffic control and monitoring module 222 for a particular container namespace 220, the configuration generation module 232 may execute a namespace selection command that includes an identifier for the selected namespace 220. The configuration generation module 232 then executes a configuration command to program the firewall in the selected namespace in accordance with the management instructions. For example, in the Linux operating environment, the configuration generation module 232 executes a SetNS(X) command, where X is the namespace identifier. The configuration generation module 232 then execute the iptables process to cause the configuration generation module 232 to program filtering tables of the container traffic control module 222 associated with a particular container 224 in the namespace 220 in accordance with the management instructions and to report traffic through the firewall using the workload identifier. After configuring the container traffic control module 222, the configuration generation module 232 may re-execute the namespace selection command referencing an identifier for a different container namespace 220 or return to the host namespace 210.

The configuration generation module 232 may similarly configure the host traffic control and monitoring module 212 according to management instructions for the host namespace workload 214 (e.g., by programming filtering tables of the host traffic control and monitoring module 212). Additionally, the configuration generation module 232 may configure the host traffic control and monitoring module 212 to report traffic flow information to and from the host namespace workload 214 to the traffic flow reporting module 236 in the same manner described above. In order to configure the host traffic control and monitoring module 212, configuration module may execute a namespace selection command to select the host namespace 210 and then execute a configuration command (e.g., iptables) to program a firewall of the host traffic control and monitoring module 212.

The traffic flow reporting module 236 obtains traffic information from each of the traffic control and monitoring modules 222 indicating traffic to and from each of the containers 224. Workload identifiers associated with the containers 224 are attached as metadata to the traffic information to enable the traffic flow reporting module 236 to uniquely associate different traffic flows with different containers 224. The traffic flow reporting module 236 reports the detected traffic to the segmentation server 120. The traffic flow reporting module 236 may similarly obtain and report traffic associated with a host namespace workload 214.

The container orchestration module 234 manages the containers 224. For example, the container orchestration module 234 may cause creation of a new container 224 in a new container namespace 220 or in an existing container namespace 220. The container orchestration module 234 may furthermore remove containers 224 from the OS instance 130. In an embodiment, the container orchestration module 234 maintains a repository with identifying information for each container 224, its respective container namespace 220, and its respective labels. In one embodiment, upon creating a new container 224, the container orchestration module 234 generates labels for the container 224 and sends the labels to the segmentation server 120. Alternatively, the labels may be generated from the containers 224 themselves or from the operating system file system or other environment variables. The segmentation server 120 may then generate a workload identifier for the container 224 and send the workload identifier to the container orchestration module 234. The container orchestration module 234 stores the workload identifier in the repository to enable it to uniquely identify the container 224. The workload identifier may furthermore be used by the configuration generation module 232 to configure the respective traffic control and monitoring modules 222 to attach the workload identifier to reported traffic flow information as described above. An example of a container orchestration module 234 may comprise for example, OPENSHIFT, KUBERNETES, or MESOS.

Advantageously, the configuration generation module 232 operates in the host namespace 210 but injects configurations into the respective container traffic control and monitoring modules 222 (e.g., by programming respective firewalls) of the respective container namespaces 220. This configuration is preferable over an architecture in which a separate configuration generation module 232 executes in each of the containers 224 because it enables the containers 224 to remain lightweight. Thus, each container 224 may execute only the processes necessary for a specific application in accordance with their intended operation and undesirable overhead may be avoided. Furthermore, this architecture is beneficial because it is agnostic to the particular type of container system being used, and thus works for any type of container 224 regardless of the specific network protocols or file systems it employs. For example, the described architecture is compatible with container systems in which the containers 224 do not have full file systems or the standard packages (e.g., an iptables executable) generally utilized to generate a configuration of the traffic control and monitoring module 222.

The described configuration is also preferable over an architecture in which the host traffic control and monitoring module 212 directly controls traffic into and out of the containers 224 because the host traffic control module 212 may not have sufficient visibility into the containers 224 to robustly identify, filter, and report traffic in accordance with the segmentation policy. For example, depending on the container architecture being used, a traffic control and monitoring module operating solely in the host namespace 210 would have to be specifically configured to accommodate a wide variety of different protocols and configurations associated with different types of containers 224 and may still be unable to identify all relevant packet headers required for enforcement and reporting. The described solution is beneficially agnostic to the particular container networking technology being used in the containers 224 and does not require any assumptions about the configurations of the containers 224. By executing the configuration generation module 232 in the host namespace 210 and generating configurations of the container traffic control and monitoring modules 222 in their respective container namespaces 220, the described solution can operate efficiently with any container architecture and can operate with low overhead and robust performance.

Associating unique workload identifiers to containers 224 and attaching the workload identifier to reported traffic flow information furthermore beneficially enables granular tracking of traffic flows in a containerized environment in which other identifiers, such as IP address, are not reliable identifiers for a particular container 224. Rather, unlike an IP address, which may be frequently re-assigned or may be behind network address translation (NAT) mechanisms, the workload identifier is assigned in a manner that makes it unique to the container 224 and remains constant during operation of the container 224, thereby enabling more reliable and more granular tracking of traffic flows.

Figure 3:
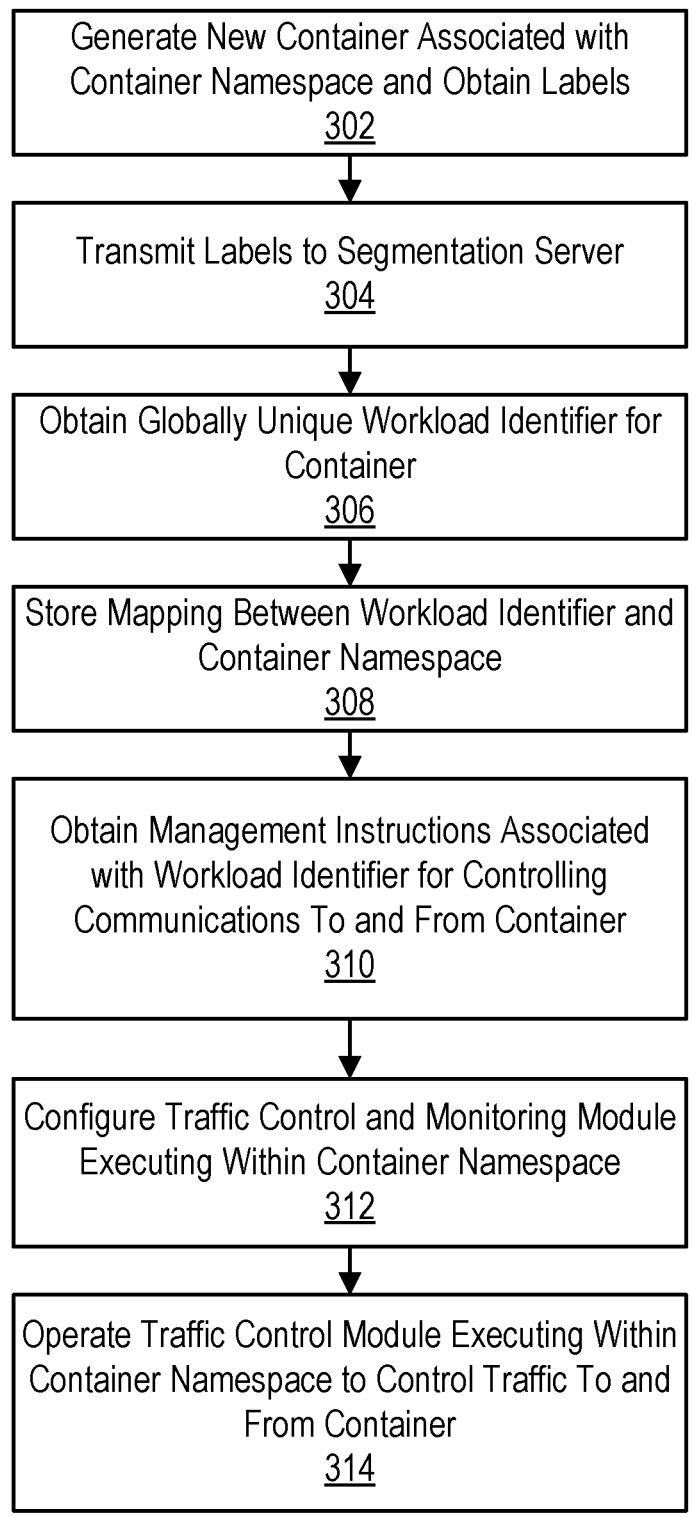
FIG. 3 is a flowchart illustrating an example embodiment of a process for enforcing a segmentation policy on a container.

FIG. 3 illustrates an example embodiment of a process for enforcing a segmentation policy on an OS instance 130 executing one or more containers 224. The container orchestration module 234 generates 302 a new container 224 associated with a container namespace 220 and obtains labels for the container 224. The container orchestration module 234 transmits 304 the labels to the segmentation server 120, which generates a globally unique workload identifier for the container 224. The container orchestration module 234 obtains 306 the workload identifier for the container 224 and stores 308 a mapping between the workload identifier and the container namespace 220. The configuration generation module 232 obtains management instructions relevant to the container 224 for controlling communications to and from the container 224. For example, the management instructions may include a set of rules referencing label sets to which the rules are applicable and membership information referencing workload identifiers (including the workload identifier for the container) for workloads having the label sets referenced in the rules. The configuration generation module 232 configures 310 the container traffic control and monitoring module 222 associated with the container 224 in the container namespace 220. The container traffic control and monitoring module 222 operates 312 in the container namespace 220 to control and monitor traffic to and from the container 224.

Figure 4:
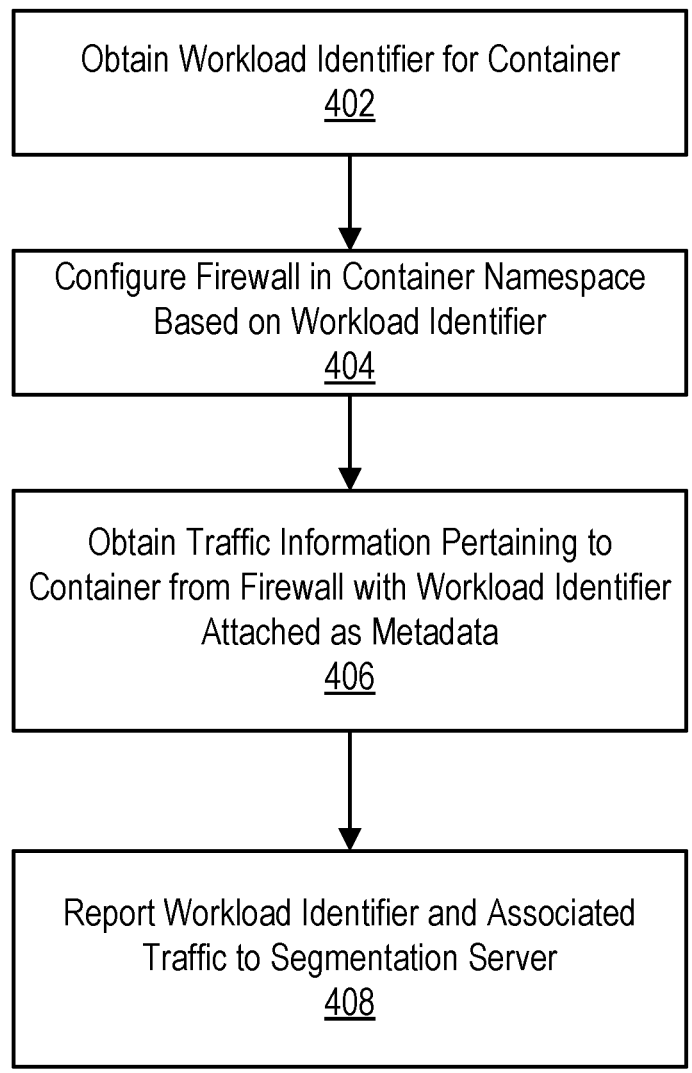
FIG. 4 is a flowchart illustrating an example embodiment of a process for monitoring traffic flows associated with a container in a segmented network environment.

FIG. 4 illustrates an embodiment of a process for monitoring traffic flows of containers in a containerized environment. The configuration generation module 232 obtains 402 a workload identifier for a container 224 (e.g., from the segmentation server 120 or indirectly via the container orchestration module 234). The configuration generation module 232, which executes in the host namespace 210, configures 404 a firewall of the traffic control and monitoring module 222 in the container namespace 220 of the container 224 based on the workload identifier. For example, the configuration generation module 232 configures a rule of the firewall to report traffic to and from the container 224 to the traffic flow reporting module 236 and to attach the workload identifier as metadata associated with the reported traffic information. The traffic flow reporting module 236 obtains 406 the traffic flow information from the traffic control and monitoring module 222 pertaining to the traffic flows to and from the container 224 with the workload identifier attached as metadata to the traffic flow information. The traffic flow reporting module 236 reports 408 the traffic information and the workload identifier associated with the traffic flow information to the segmentation server 120.

Based on the received traffic flows, the segmentation server 120 can generate a traffic flow graph representative of traffic flows in the administrative domain 150. Here, nodes of the traffic flow graph may represent particular workloads 138 and edges may represent traffic flows between the workloads 138. The traffic flow graph thus represents which workloads 138 of the administrative domain 150 are connected and which workloads 138 are not connected.

The segmentation server 120 may utilize the workload identifiers associated with the traffic information to correlate traffic flow information received from hosts 130. For example, a first host 130 may report outbound traffic from a first workload 138 having a first workload identifier from a source IP address to a destination IP address using particular ports and protocols. A second host 130 may report inbound traffic to a second workload 138 having a second workload identifier in which the traffic information specifies the same source and destination IP address and the same ports and protocols. The segmentation server 120 may determine that these reported traffic flows are indicative of a connection between the first workload 138 having the first workload identifier and the second workload 138 having the second workload identifier. The segmentation server 120 may create an edge in the traffic flow graph representative of the connection.

In some cases, the source and destination IP addresses observed by the firewall at the remote workload 138 in a particular communication may not match the source and destination IP address observed by the firewall at the local workload 138 due to network address translation. In this case, the segmentation server 120 may identify possible matches based on the reported ports and protocols and may make predictions about the network address translation to learn correlations between future reported traffic flows. In an embodiment, a heuristic algorithm may be applied to identify correlations between traffic flows reported by the firewalls at different ends of a communication to determine additional edges in the traffic flow graph.

Additionally, the container orchestration module 234 may control containers 224 in a manner that may terminate a particular container 224 when it is not being used and later re-instantiate a container 224 configured to perform essentially the same function as the original container 224. Because these containers 224 have a similar profile and serve the same function, it may be desirable from the perspective of the segmentation server 120 to treat these containers 224 as a single container 224, or as separate but linked containers 224, for the purpose of providing management instructions and tracking traffic flows. These containers 224 may have different IP addresses, but can be linked by the segmentation server 120 using the workload identifier. Here, upon detecting a newly instantiated container 224, the segmentation server 120 may identify that the container 224 is linked to a previously terminated container 224 by detecting similarities in the labels and other metadata associated with the containers 224. The segmentation server 120 may then store a link between the respective workload identifiers for the containers 224 and may combine traffic flow information from the linked containers 224 to treat them as a single node in the traffic flow graph. Alternatively, the segmentations server 120 may re-assign the workload identifier from the terminated container 224 to the re-instantiated container 224 when it detects a match between the labels and other metadata indicating that the containers 224 serve the same function. In this way, the segmentation server 120 can generate a traffic flow graph that more effectively describes the state of the network.

The segmentation server 120 may generate a graphical representation of the traffic flow graph that may be presented to an administrator via the administrative client 160 to enable the administrator to analyze various aspects of the administrative domain 150. Additionally, the traffic flow graphs may be used to automatically update the segmentation policy to provide improved security. For example, if it is observed that no traffic flows are present between two groups of workloads 138, a rule permitting the communications may be updated to be more restrictive, such that communications between the groups of workloads 138 are no longer permitted. By reducing the number of permitted connections, the administrative domain 150 may beneficially become better protected against malicious attacks.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for monitoring traffic flows associated with a container, comprising:
   obtaining, by a configuration generation module executing in a host namespace of a host operating system, a workload identifier for the container executing in a container namespace of the host operating system, the container executing processes associated with an application;
   configuring, by the configuration generation module, a firewall executing within the container namespace of the container, the firewall to report traffic information pertaining to traffic to and from the container to a traffic flow reporting module executing in the host namespace, and to attach the workload identifier for the container as metadata to the traffic information, the traffic associated with operation of the processes of the application;
   obtaining, by the traffic flow reporting module from the firewall executing in the container namespace, the traffic information pertaining to the container including the workload identifier; and
   reporting, by the traffic flow reporting module, the workload identifier and the traffic information pertaining to the container to a segmentation server to enable the segmentation server to update a segmentation policy based on the traffic information.

2. The method of claim 1, further comprising:
   obtaining a label set associated with the container from a container orchestration layer of the host operating system, the label set comprising one or more labels;
   transmitting the label set to the segmentation server, wherein the segmentation server generates the workload identifier for the container based on the label set.

3. The method of claim 1, wherein configuring the firewall comprises:
   executing a command to select the container namespace; and
   executing a utility program in the host namespace to configure tables of the firewall associated with the container namespace.

4. The method of claim 1, wherein the traffic flow information relating to inbound communication to the container comprises a source IP address of a remote workload providing the inbound communication, a port of the remote workload providing the inbound communication, a destination IP address of the container receiving the inbound communication, a port of the container receiving the inbound communication, and a protocol associated with the inbound communication.

5. The method of claim 1, wherein the traffic flow information relating to outbound communication from the container comprises a destination IP address of a remote workload receiving the outbound communication, a port of the remote workload receiving the outbound communication, a source IP address of the container sending the outbound communication, a port of the container sending the outbound communication, and a protocol associated with the outbound communication.

6. The method of claim 1, wherein the workload identifier for the container is assigned by the segmentation server and remains constant during a lifespan of the container.

7. The method of claim 1, wherein the container namespace and the host namespace share a kernel of the operating system instance.

8. A non-transitory computer-readable storage medium storing instructions for monitoring traffic flows associated with a container, the instructions when executed by a processor causing the processor to perform steps including:
   obtaining, by a configuration generation module executing in a host namespace of a host operating system, a workload identifier for the container executing in a container namespace of the host operating system, the container executing processes associated with an application;
   configuring, by the configuration generation module, a firewall executing within the container namespace of the container, the firewall to report traffic information pertaining to traffic to and from the container to a traffic flow reporting module executing in the host namespace, and to attach the workload identifier for the container as metadata to the traffic information, the traffic associated with operation of the processes of the application;
   obtaining, by the traffic flow reporting module from the firewall executing in the container namespace, the traffic information pertaining to the container including the workload identifier; and
   reporting, by the traffic flow reporting module, the workload identifier and the traffic information pertaining to the container to a segmentation server to enable the segmentation server to update a segmentation policy based on the traffic information.

9. The non-transitory computer-readable storage medium of claim 8, wherein the instructions when executed further cause the processor to perform steps including:

obtaining a label set associated with the container from a container orchestration layer of the host operating system, the label set comprising one or more labels;

transmitting the label set to the segmentation server, wherein the segmentation server generates the workload identifier for the container based on the label set.

10. The non-transitory computer-readable storage medium of claim 8, wherein configuring the firewall comprises:

executing a command to select the container namespace; and executing a utility program in the host namespace to configure tables of the firewall associated with the container namespace.

11. The non-transitory computer-readable storage medium of claim 8, wherein the traffic flow information relating to inbound communication to the container comprises a source IP address of a remote workload providing the inbound communication, a port of the remote workload providing the inbound communication, a destination IP address of the container receiving the inbound communication, a port of the container receiving the inbound communication, and a protocol associated with the inbound communication.

12. The non-transitory computer-readable storage medium of claim 8, wherein the traffic flow information relating to outbound communication from the container comprises a destination IP address of a remote workload receiving the outbound communication, a port of the remote workload receiving the outbound communication, a source IP address of the container sending the outbound communication, a port of the container sending the outbound communication, and a protocol associated with the outbound communication.

13. The non-transitory computer-readable storage medium of claim 8, wherein the workload identifier for the container is assigned by the segmentation server and remains constant during a lifespan of the container.

14. The non-transitory computer-readable storage medium of claim 8, wherein the container namespace and the host namespace share a kernel of the operating system instance.

15. A computing device for monitoring traffic flows associated with a container, the computing device comprising:

one or more processors; and a non-transitory computer-readable storage medium storing instructions that when executed by the one or more processors cause the one or more processors to perform steps including:

obtaining, by a configuration generation module executing in a host namespace of a host operating system, a workload identifier for the container executing in a container namespace of the host operating system, the container executing processes associated with an application;

configuring, by the configuration generation module, a firewall executing within the container namespace of the container, the firewall to report traffic information pertaining to traffic to and from the container to a traffic flow reporting module executing in the host namespace, and to attach the workload identifier for the container as metadata to the traffic information, the traffic associated with operation of the processes of the application;

obtaining, by the traffic flow reporting module from the firewall executing in the container namespace, the traffic information pertaining to the container including the workload identifier; and reporting, by the traffic flow reporting module, the workload identifier and the traffic information pertaining to the container to a segmentation server to enable the segmentation server to update a segmentation policy based on the traffic information.

16. The computing device of claim 15, wherein the instructions when executed further cause the processor to perform steps including:

obtaining a label set associated with the container from a container orchestration layer of the host operating system, the label set comprising one or more labels;

transmitting the label set to the segmentation server, wherein the segmentation server generates the workload identifier for the container based on the label set.

17. The computing device of claim 15, wherein configuring the firewall comprises:

executing a command to select the container namespace; and executing a utility program in the host namespace to configure tables of the firewall associated with the container namespace.

18. The computing device of claim 15, wherein the traffic flow information relating to inbound communication to the container comprises a source IP address of a remote workload providing the inbound communication, a port of the remote workload providing the inbound communication, a destination IP address of the container receiving the inbound communication, a port of the container receiving the inbound communication, and a protocol associated with the inbound communication.

19. The computing device of claim 15, wherein the traffic flow information relating to outbound communication from the container comprises a destination IP address of a remote workload receiving the outbound communication, a port of the remote workload receiving the outbound communication, a source IP address of the container sending the outbound communication, a port of the container sending the outbound communication, and a protocol associated with the outbound communication.

20. The computing device of claim 15, wherein the workload identifier for the container is assigned by the segmentation server and remains constant during a lifespan of the container.

* * * * *